United States Patent
Dettinger et al.

(10) Patent No.: US 7,552,429 B2
(45) Date of Patent: Jun. 23, 2009

(54) INTEGRATED DEVELOPMENT ENVIRONMENT FOR MANAGING SOFTWARE LICENSING RESTRICTIONS

(75) Inventors: Richard D. Dettinger, Rochester, MN (US); Daniel P. Kolz, Rochester, MN (US); Cale T. Rath, Byron, MN (US); Shannon E. Wenzel, Colby, WI (US)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 11/111,219

(22) Filed: Apr. 21, 2005

(65) Prior Publication Data

US 2006/0242077 A1 Oct. 26, 2006

(51) Int. Cl.
*G06F 9/44* (2006.01)
(52) U.S. Cl. ..................................................... 717/162
(58) Field of Classification Search ......... 717/162–164; 705/59; 707/9–10
See application file for complete search history.

(56) References Cited

U.S. PATENT DOCUMENTS

| | | | | |
|---|---|---|---|---|
| 5,204,897 | A * | 4/1993 | Wyman | 710/200 |
| 5,438,508 | A * | 8/1995 | Wyman | 705/8 |
| 5,933,497 | A | 8/1999 | Beetcher et al. | |
| 6,411,941 | B1 * | 6/2002 | Mullor et al. | 705/59 |
| 7,171,662 | B1 * | 1/2007 | Misra et al. | 717/177 |
| 2002/0107809 | A1 * | 8/2002 | Biddle et al. | 705/59 |
| 2003/0048907 | A1 * | 3/2003 | Nakahara et al. | 380/277 |
| 2004/0039916 | A1 * | 2/2004 | Aldis et al. | 713/177 |
| 2004/0046787 | A1 | 3/2004 | Henry et al. | |
| 2004/0068734 | A1 | 4/2004 | Bond et al. | |
| 2004/0073789 | A1 * | 4/2004 | Powers | 713/165 |
| 2005/0125358 | A1 * | 6/2005 | Levin et al. | 705/59 |
| 2005/0125359 | A1 * | 6/2005 | Levin et al. | 705/59 |
| 2006/0031226 | A1 * | 2/2006 | Cope et al. | 707/10 |
| 2006/0212464 | A1 * | 9/2006 | Pedersen | 707/101 |

FOREIGN PATENT DOCUMENTS

CA 2 399 317 A1 3/2004

OTHER PUBLICATIONS

Dozier et al. "Creation of an Expert Witness Database Through Text Mining", Jun. 2003, ACM, pp. 177-184.*
Mourse, "The KScalar simulator", Mar. 2002, ACM, JERIC, vol. 2, Issue 1, pp. 73-116.*

* cited by examiner

*Primary Examiner*—Wei Y Zhen
*Assistant Examiner*—Anna Deng
(74) *Attorney, Agent, or Firm*—Patterson & Sheridan, LLP

(57) ABSTRACT

The present invention generally provides methods, systems, and articles of manufacture that provide a managed software development environment. In one embodiment, software programmers interact with the managed software development environment to develop a target software application. Embodiments of the invention prevent source code from being included in the target software application if the license for the project is incompatible with either the license under which the source code is available or with company policy. Embodiments of the invention further prevent linking to a library file if the library file is available under a license that is incompatible with the intended license of the target software application.

18 Claims, 9 Drawing Sheets

| LICENSE REQUIREMENTS | PUBLIC DOMAIN | BSD/MIT LICENSE | COMMON PUBLIC LICENSE | LESSER GNU PUBLIC LICENSE | OPEN SOFTWARE LICENSE | GNU PUBLIC LICENSE |
|---|---|---|---|---|---|---|
| MAINTAIN ATTRIBUTION AND/OR DISCLAIMER | NO | YES | YES | YES | YES | YES |
| MUST DISTRIBUTE MODIFIED SOURCE CODE | NO | NO | YES | YES | YES | YES |
| MUST DISTRIBUTE DERIVATE WORK UNDER LICENSE OF PARENT WORK | NO | NO | NO | NO | YES | YES |

⟨ GENERALLY LESS RESTRICTIVE ⟷ GENERALLY MORE RESTRICTIVE ⟩

|  | PUBLIC DOMAIN | BSD/MIT | LGPL | GPL |
|---|---|---|---|---|
| PROJECT 1 | ALLOW | ALLOW | ALLOW | ALLOW |
| PROJECT 2 | DENY | DENY | DENY | DENY |
| PROJECT 3 | ALLOW | ALLOW | DENY | DENY |
| PROJECT N | DENY | ALLOW | DENY | DENY |

TARGET LICENSE

| REQUIREMENT | PROJECT | FILE |
|---|---|---|
| MIT LICENSE | PROJECT 1 | APACHE FILE.C |
| MIT LICENSE | PROJECT 1 | APACHE FILE 2.C |
| GPL | PROJECT 3 | GNU CRYPTO.C |

| PROJECT | FILE |
|---|---|
| PROJECT 1 | SAMPLE.JAVA |
| PROJECT 1 | ARCHIVE.JAR |
| PROJECT 3 | GNU CRYPTO.C |

*FIG. 5C*

INTEGRATED DEVELOPMENT ENVIRONMENT FOR MANAGING SOFTWARE LICENSING RESTRICTIONS

BACKGROUND OF THE INVENTION

1. Field of the Invention

The present invention generally relates to an integrated software development environment (IDE) for managing software development projects that incorporate source code subject to licensing restrictions.

2. Description of the Related Art

Computer programs are written using programming languages such as C, C++, Java®, Pascal, and Perl. The text of a computer program written in such a language is called the source code. Depending on the complexity of the program, the source code for a program may only require a few lines of text, or it may require millions of lines spread across many modules. Before a computer can execute a program, the source code must be converted into object code by compilers, assemblers or interpreters (each itself a software application). Object code includes a sequence of instructions that may be executed by a particular computer system.

In writing the source code for a program, programmers routinely rely on libraries to perform a variety of programmatic tasks, for example, printing data files or logging onto a network. Libraries typically provide a set of functions, methods, objects or classes (depending on the library and the programming language) that a programmer may include in the source code for a program being developed. Libraries may be provided by the programming language, written by third-parties, or the programmers themselves. Depending on how a library is distributed, a programmer may have access to both the source code and object code for a library, or may only have access to the object code. Distributing only the object code allows a programmer to write source code that calls the functions provided by the library, without providing the programmer with the implementation of the functions.

Additionally, programmers frequently share source code with one another to communicate different ideas, or to share examples of code written to perform a particular function. Further, programmers often re-use portions of source code from one program in others. For example, programmers often use clipboard features to copy and paste source code from one file into another, or write source code that links to a module or library written for another program. Re-using source code prevents developers from having to "re-invent the wheel," and allows business to develop software that is more reliable, built faster, and less expensive. Given the effectiveness of re-using source code, very few software programs are written from scratch. Simply including source code from one program in another, or including a call to a function from an available library, however, may limit how software incorporating such source code may be distributed.

Typically, software applications, including libraries, are distributed under the terms of a license agreement. Given the expense that a business may incur in developing a software application, it will often distribute only the compiled and executable form of the software (i.e., object code), and not distribute the source code with the program. The license for a software application typically allows the end-user to install and execute the program, but prohibits the end-user from making or distributing any changes, modifications or derivative works of the software application.

From its beginnings in the early 1980's, an "open" distribution model has gained substantial popularity, especially among software developers. An open source software project typically distributes the source code together with the application, under the terms of an open source license. Open source licenses typically allow anyone to submit improvements, and to use the source code, or portions thereof, themselves. This includes fixing bugs in the open source projects, improving its performance, adding features, or building entirely new applications that include the source code.

In exchange, most open source licenses require that applications including the open source code be distributed with an attribution indicating that code from a particular project is included in the application (e.g., the well-known the BSD and MIT open source licenses). Other open source licenses also require that any derivative works, i.e., any software program that incorporates source code from the open source project, must itself be distributed under an open source licenses (e.g., the GNU foundation General Public License (GPL) and Lesser General Public License (LGPL)). These latter licenses prevent source code distributed under an open source license from being included in software applications distributed using a "closed" license.

Open source code offers many opportunities for organizations today, and the open source distribution model has produced many well-known and highly regarded software applications. However, the accidental use of open source code in a product that a business intends to distribute using a closed license (or vice versa) can have substantial consequences. For example, some open source licenses require that if source code is included (or in some cases linked to) in a target software program, then the source code for the target software program must itself be made available under the license used by the open source project. Thus, a software program that a business intends to distribute under a closed license may be forced open by the unintentional inclusion of open source code. Further, once source code that a business wishes to remain proprietary is distributed under an open source license, there may be little opportunity to "take back" the code, and prevent its distribution.

As described above, some open source licenses require that the license for the target program include an attribution indicating that the target program includes source code from the open source project. The target program may still be distributed under a closed license, but the license must include the attribution. Compliance with this requirement creates administrative overhead, unrelated to the actual software development that must be managed.

Unfortunately, it is often difficult to determine which open source code may be included in a target program, which can be included if changes are made to the license used to distribute the target program, and which must be avoided entirely. Even if a software application being developed is going to be distributed under an open source license, not all open source licenses are compatible. Thus, it can become very difficult for a programmer to make good decisions, even with the best of intentions. Further, because a programmer may be focused on writing code, she may not consider (or properly understand) the legal issues involved in incorporating source code from an open source project into an application. Because of these problems, many businesses simply prohibit using any open source code in a software project. Doing so avoids the legal or administrative issues, but also ignores valuable resources provided by the open source community. Accordingly, there is a need for a software development process that manages the co-mingling of source code from different sources, including open source projects.

SUMMARY OF THE INVENTION

The present invention generally provides methods, systems, and articles of manufacture that provide a managed software development environment configured to ensure that all source code included into a project comply with company requirements, and that any license requirements created by copying source code (or linking to a library) from an open source project are satisfied.

One embodiment of the invention provides a computer-implemented method of managing a software development project that incorporates code objects subject to licensing restrictions. The method generally includes controlling the association of a code object with the software development project. The controlling generally includes identifying a target software license associated with the software development project, identifying a license associated with the code object, and allowing the code object to be included in the software development project only if the license associated with the code object is compatible with the target software license.

Another embodiment of the invention provides a computer readable medium containing a program, which when executed on a processor, performs operations. The operations generally include identifying a plurality of code objects associated with a software development project, associating a target software license with the software development project, and controlling the association of an additional code object with the software development project. The controlling generally includes determining a license, under which the additional code object is available, and allowing the additional code object to be included in the software development project only if the target software license and the license under which the additional code object is available are compatible with one another.

Another embodiment of the invention provides a system that includes an integrated development environment. The integrated development generally includes a text editor configured to manipulate a plurality of code objects associated with a software development project, and a license manager configured to control the association of an additional code object with the software development project by determining a license, under which the additional code object is available, and allowing the additional code object to be included in the software development project only if the target software license and the license under which the additional code object is available are compatible with one another.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments illustrated by the appended drawings. These drawings, however, illustrate only typical embodiments of the invention and are not limiting of its scope, for the invention may admit to other equally effective embodiments.

FIG. 1 illustrates a table of well known open source licenses sorted in the table by requirements imposed upon the licensee.

FIGS. 5A-5C illustrates a license table used by a license manager component, according to one embodiment of the invention.

DETAILED DESCRIPTION OF THE PREFERRED EMBODIMENTS

Figure 2:
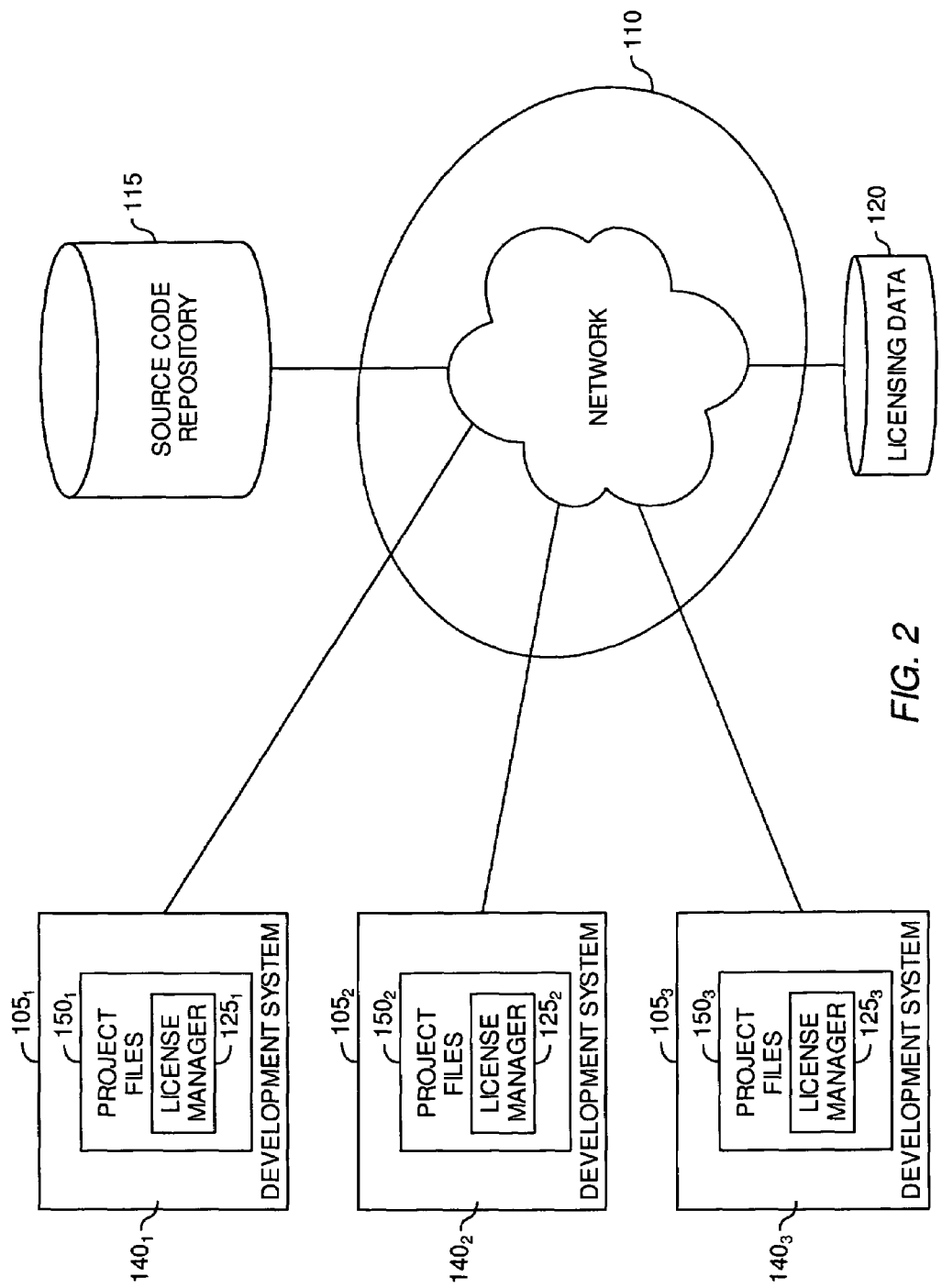
FIG. 2 illustrates a relational view of an application development system running an integrated development environment, according to one embodiment of the invention.

The present invention generally provides methods, systems, and articles of manufacture that provide a managed software development environment. The managed environment ensures that source code incorporated into a project complies with company requirements, and ensures compliance with any license requirements created by importing source code or by using file or object into a project. In one embodiment, software programmers interact with an integrated development environment (IDE) to develop a target software application. The IDE may limit what files may be accessed to those already associated with a given development project. Also, the build system provided by the IDE (i.e., the compiler, linker, etc) may control the libraries that the source code for a project is compiled against to those approved for the project.

In one embodiment, software development is divided into projects, and each item associated with a given project has licensing data. Further, the environment maintains data regarding the compatibility (or incompatibility) among different software distribution licenses. Projects also maintain information about the target license for the project, and any requirements imposed by a particular item in the project. The items associated with a project include source code files (e.g., text files with Java®, C, C++ source code), and other resources such as images, fonts, documentation, etc.

Embodiments of the invention prevent a developer from inadvertently including source code in a file if the license for a project is incompatible with either the license under which the source code is available or with company policy. Embodiments of the invention may also be used to prevent a developer from inadvertently linking to a library file if doing so would be incompatible for the same reasons. As a developer copies and pastes source code into the project, or imports a library file into a project, a license manager operates to determine under what license the code (or library) is available. If this license conflicts with the intended license of the application being developed, or with company policy, the code is prohibited from being included in the application. Alternatively, the developer may be given a warning message of the identified conflict and allowed to elect whether to proceed with the copying/linking. In a particular case, this may prevent a developer from accessing the source code for a library, but still allow the software application being developed to link to the functions provided by the library.

As described above, software (both applications and source code) are typically distributed using a software license agreement. Software licenses are used to form enforceable agreements between those who provide/distribute software and those who receive it. Further, computer software applications (both source and object code) are typically "works of authorship," and accorded protection under copyright law. The particular rights granted to a holder of a copyright may vary according to the controlling law in a given jurisdiction. Under U.S. copyright law (a body of federal law), for example, the rights granted to the holder of a copyright include:

1. The exclusive right to copy the work;
2. The exclusive right to make derivative works;
3. The exclusive right to distribute the work;
4. The exclusive right to perform the work; and
5. The exclusive right to display the work.

A license conveys one or more of these rights to the licensee (the recipient of the license). A "closed" license typically allows a licensee to install a software application (create a single copy of the work, right #1) and to execute the software application (perform the work, right #4), in exchange for the end licensee's purchase of the license. In contrast, an open source license typically allows a licensee to engage in all of the normally exclusive rights provided by copyright law, in exchange for the promise to distribute the work, and any derivative works, under terms specified by the open source license.

One embodiment of the invention has particular application to "derivative works." When source code from an open source project is included in a target application, the target application may often be a "derivate work" of the open source project under U.S. copyright law. Many open source licenses restrict how derivative works may be distributed, and specify whether the source code for a "derivative work" must be distributed with the object code. FIG. 1 is a table illustrating the restrictions imposed by a number of well known open source licenses.

The requirements imposed on the redistribution of software that includes source code from an open source project vary among different open source licenses. Some open source licenses only require attribution that code distributed under the open source license was included in a particular software application. For example, the well-known BSD license provides:

Copyright (c) <YEAR>, <OWNER>
All rights reserved.
Redistribution and use in source and binary forms, with or without modification, are permitted provided that the following conditions are met:
Redistributions of source code must retain the above copyright notice, this list of conditions and the following disclaimer.
Redistributions in binary form must reproduce the above copyright notice, this list of conditions and the following disclaimer in the documentation and/or other materials provided with the distribution.
Neither the name of the <ORGANIZATION> nor the names of its contributors may be used to endorse or promote products derived from this software without specific prior written permission.

The BSD license does not require that the source code be released or distributed, only the acknowledgement that the software includes code from a particular source (e.g., a particular university or company). Thus, source code distributed under the BSD license (and the MIT license as well) may be incorporated into proprietary software.

In contrast, the GPL, in part, provides: "you must cause any work that you distribute or publish, that in whole or in part contains or is derived from the Program or any part thereof, to be licensed as a whole at no charge to all third parties under the terms of [the GPL]." In other words, derivative works of a project distributed under the GPL must be licensed under the GPL as well, and must also be subject to all of the GPL's restrictions. Some libraries are distributed under a modified form of the GPL, the LPGL. The LPGL allows a library (e.g., a Java® jar file or package, dynamically linked library file (DLL), or a shared object file) to be linked with proprietary code, but does not require that the proprietary code also be distributed under the terms of the LGPL or GPL.

This brief overview is not meant as an authoritative or an exhaustive description of copyright law as it relates to open source licenses, or legal requirements of a software license in general. Rather, this overview is provided to be illustrative of how the invention operates to work with the problems faced by an organization developing a software application when source code from an open source project is mingled with proprietary code. Embodiments of the invention provide an IDE configured to manage these problems, regardless of the particularities of applicable copyright law. Additionally, embodiments of the invention may be used to manage license requirements created exclusively from "closed" licenses.

The following description references embodiments of the invention. The invention, however, is not limited to any specifically described embodiment; rather, any combination of the following features and elements, whether related to a described embodiment or not, implements and practices the invention. Moreover, in various embodiments the invention provides numerous advantages over the prior art. Although embodiments of the invention may achieve advantages over other possible solutions and the prior art, whether a particular advantage is achieved by a given embodiment does not limit the scope of the invention. Thus, the following aspects, features, embodiments and advantages are illustrative of the invention and are not considered elements or limitations of the appended claims; except where explicitly recited in a claim. Similarly, references to "the invention" should neither be construed as a generalization of any inventive subject matter disclosed herein nor considered an element or limitation of the appended claims; except where explicitly recited in a claim.

One embodiment of the invention is implemented as a program product for use with a computer system such as, for example, the computer system 100 shown in FIG. 2 and described below. The program product defines functions of the embodiments (including the methods) described herein and can be contained on a variety of storage media. Illustrative storage media include, without limitation, (i) information permanently stored on non-writable storage media (e.g., read-only memory devices within a computer such as CD-ROM disks readable by a CD-ROM drive);and (ii) alterable information stored on writable storage media (e.g., floppy disks within a diskette drive or hard-disk drive).

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, the functionality of programs described herein using discrete modules or components interacting with one another. Those skilled in the art recognize, however, that different embodiments may combine or merge such components and modules in many different ways.

FIG. 2 illustrates a relational view of a software development environment, according to one embodiment of the invention. Development computer systems $105_{1-3}$ include an interface for network communications with other systems over network 110. The network 110 may be a local area network where the development systems 105 and other network elements all reside in the same general location, or may be network connections between geographically distributed systems, including network connections over the Internet. Development system 105 generally includes a central processing unit (CPU) connected by a bus to memory and storage (not shown). Each development system 105 is typically running an operating system configured to manage interaction between the computer hardware and the higher-level software applications running on development system 105. (e.g., a Linux® distribution (an open source project, available under the GNU GPL license) Microsoft Windows®, IBM's AIX® or OS/400®, FreeBSD, and the like) ("Linux" is a trademark of Linus Torvalds in the United States and elsewhere).

Each development system 105 is running an IDE software application 140, configured according to the present invention. In one embodiment, the IDE 140 includes all the tools necessary to create a software application. The IDE is used to create, access, edit, and otherwise manipulate project files 150. In a particular embodiment, the Eclipse IDE, available from the Eclipse Foundation, may be used. The Eclipse IDE, itself an open source project available under the Common Public License, is "dedicated to providing a robust, full-featured, commercial-quality, industry platform for the development of highly integrated tools." The Eclipse IDE provides an open platform for software development that allows anyone to build and distribute plug-ins to extend and modify the environment it provides. In one embodiment, the WebSphere® Studio Application Developer, built on the Eclipse IDE, and available from International Business Machines (IBM®), of Armonk, N.Y. may be used. The WebSphere® Studio Application Developer includes a set of plug-ins for the Eclipse IDE.

The project files 150 may be stored in source code repository 115. In one embodiment, the source code repository 115 may be the concurrent versioning system (CVS) software available under the GPL. CVS is a well known source code management system that provides the ability to track (and potentially revert) incremental changes to files, reporting changes to a mailing list as they are made, and that can be used by many developers concurrently. Further, CVS is configured to work with the Eclipse platform, and the plugins provided by the WebSphere® Studio Application Developer. Using the development system 105, IDE 140, and source code repository 115, a programmer may create new files, check out and edit files from a project, check in files and commit any changes made to the files. Further, embodiments of the invention place limits on what files may be included in a project, based on the software license associated with each file.

In one embodiment, the environment 100 includes licensing data 120, and a license manager 125. The licensing data 120 and license manager 125 may be maintained on a computer system (e.g., like development systems 105) connected to network 110. As illustrated, the license manager 125 may be intergraded with IDE 140, e.g., as a plug-in component running with the Eclipse platform. Alternatively, the license manager 125 may be a separate process executing on developer system 105 or a server system connected to network 110. The licensing data 120 specifies the different licenses (e.g., the licenses included in the table of FIG. 1) that may be associated with different files or objects in the environment 100. Further, licensing data 120 may include data regarding what licenses are allowed for a given project.

The environment 100 illustrated in FIG. 2, however, is merely an example of one hardware and software environment. Embodiments of the present invention may be implemented using other configurations, regardless of whether the computer systems are complex multi-user computing systems, such as a cluster of individual computers connected by a high-speed network, single-user workstations, or network appliances lacking non-volatile storage. Additionally, although FIG. 2 illustrates computer systems using a given network architecture, embodiments of the invention may be implemented in a single computer system, or in other network configurations, including peer-to-peer, distributed, or grid architectures.

Figure 3:
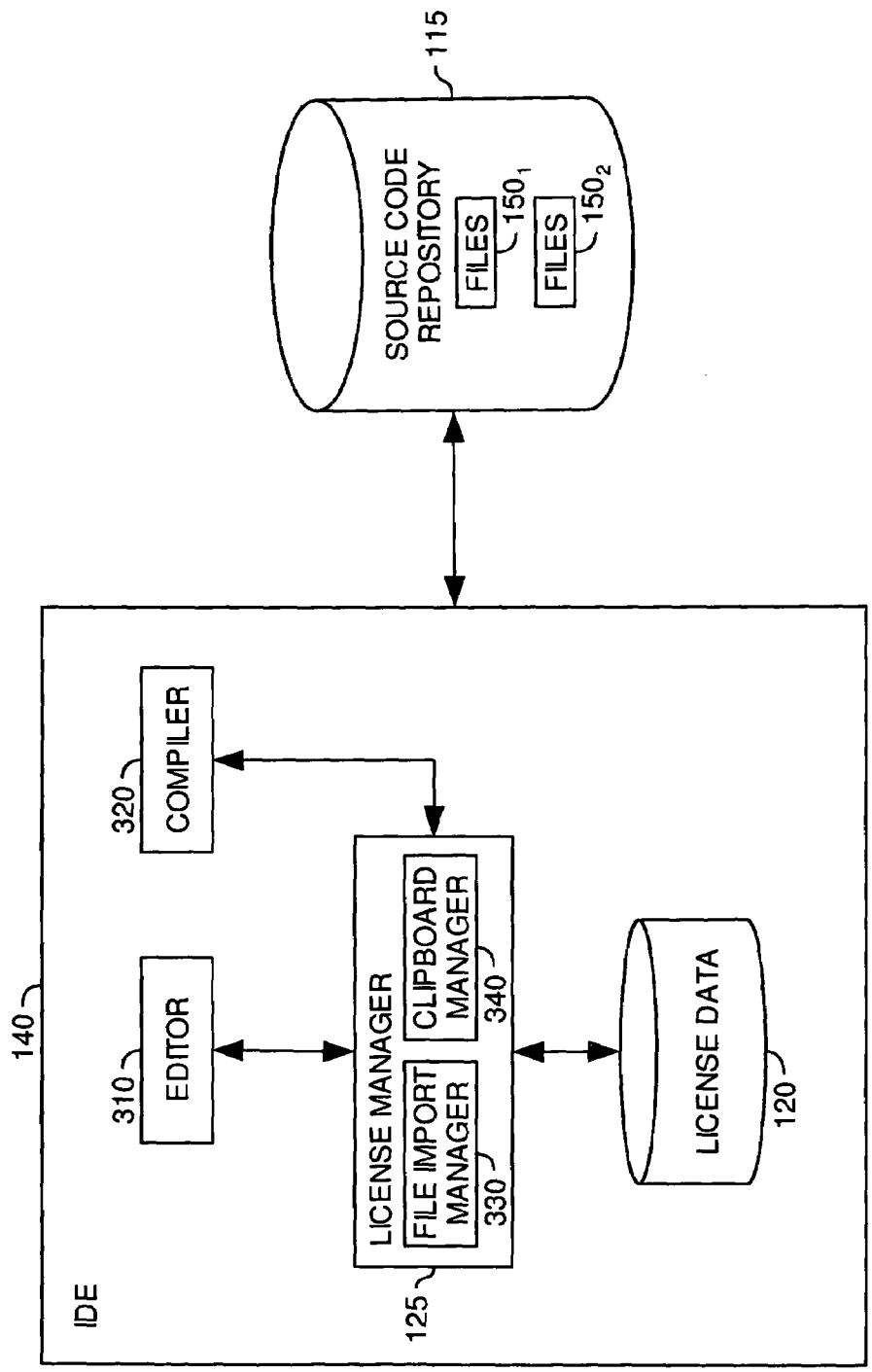
FIG. 3 further illustrates aspects of the integrated development environment, according to one embodiment of the invention.

FIG. 3 further illustrates components of the integrated development environment (IDE) 140, according to one embodiment of the invention. The IDE 140 is illustrated to include a number of components. In various embodiments, theses components may each be part of a single software application, or may be multiple software applications configured to cooperatively interact with one another. In the illustrative embodiment, one component of the IDE 140 is the editor 310. The editor 310 is a programming tool used by a software developer to edit the text (source code) of a software program. As such, the editor displays the text typed by a programmer and allows functions such as cut, copy, and paste to manipulate fragments of text. In addition, text editors 310 may include common features such as syntax highlighting and automatic indenting.

Figure 4A:
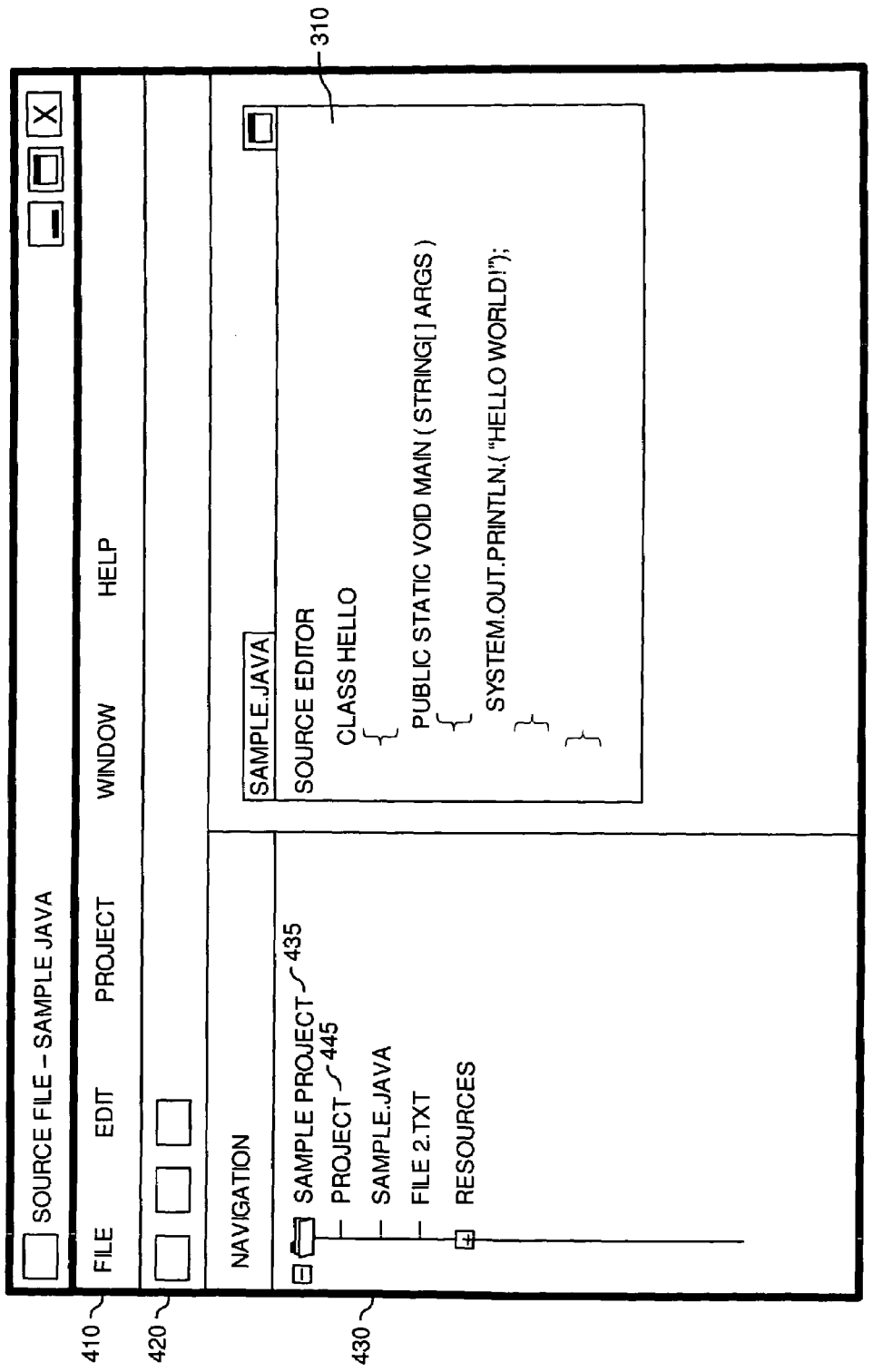
FIGS. 4A-4C illustrate exemplary graphical user interface screenshots of the integrated development environment, according to one embodiment of the invention.

For example, FIG. 4A illustrates an exemplary graphical user interface screen 400 that includes the editor 310 being used to edit the source code file 150, "sample.java." Menu 410 and button bar 420 are common GUI components used to provide access to the features provided by a particular IDE 140. In addition, all but the simplest of software applications are built using more than a single source code file 150. Thus, navigation area 430 may be configured to display all of the files currently associated with a given project. In one embodiment, when a user first initiates the IDE 140 environment, the user selects the project that the user is going to work on. Thereafter, navigation area 430 displays all the source code files 150 that have been included in the current project. As illustrated, the navigation area 430 illustrates a view of screen 400 after a user has selected the project "sample project" 435. The project file 445 may be used to store configuration values for the currently selected project. In this example, two files are associated with the project, sample.java and file2.txt.

Editor 310 displays the source code for a simple Java® class "hello" that, when compiled and executed, prints out the text "Hello World!". Referring back to FIG. 3, the compiler 320 is a component of the IDE 140. The compiler 320 is configured to generate object code from a source code file (or files). That is, the compiler takes all the source code files 150 for a particular project and generates an executable software application. For example, using the source file 150 illustrated in FIG. 4A, the compiler 320 may be configured to generate java® bytecode from the source code for the "hello" class. Subsequently, the "hello" class may be executed by a Java® virtual machine.

While a programmer is working on a selected project, (i.e., editing a source code file 150 using editor 310) license manager 125 may be configured to control the source code that may be included in the project. In one embodiment, the license manager includes a clipboard manger 340 and import manager 330. The operations of the clipboard manger 340 and import manager 330 are discussed below.

In one embodiment, the clipboard manager 340 is configured to control the copy and paste operations used to paste a source code fragment into a source code file 150. When a programmer desires to copy and paste source code into a source code file 150, the programmer first selects the source code fragment and copies it in the usual manner (e.g., by accessing cut and paste features using menu 410 and button bar 420). After copying the desired source code fragment to the clipboard, the programmer then switches to the destination source code file 150, and selects the paste feature. The clipboard manager 340 determines whether a licensing conflict exists between the source code being copied and the target source code file. In one embodiment, this determination may include comparing the license under which the source code fragment was distributed with a license associated with the target source code file 150. If the licenses are compatible, then code is pasted into the target source code file 150. If the licenses are incompatible (or if source code distributed under the license associated with the source code fragment is otherwise prohibited from being included in the target source code file), then the programmer is given an error message. In one embodiment, the error massage indicates that the copy and paste operation for the source-code was prevented due to a licensing conflict identified by licensing manager 340. The error message may allow a user to override the licensing manager 340 and perform the operation. Additional actions such as logging user activity or modifying a license associated with the target source code are also contemplated.

Figure 4B:
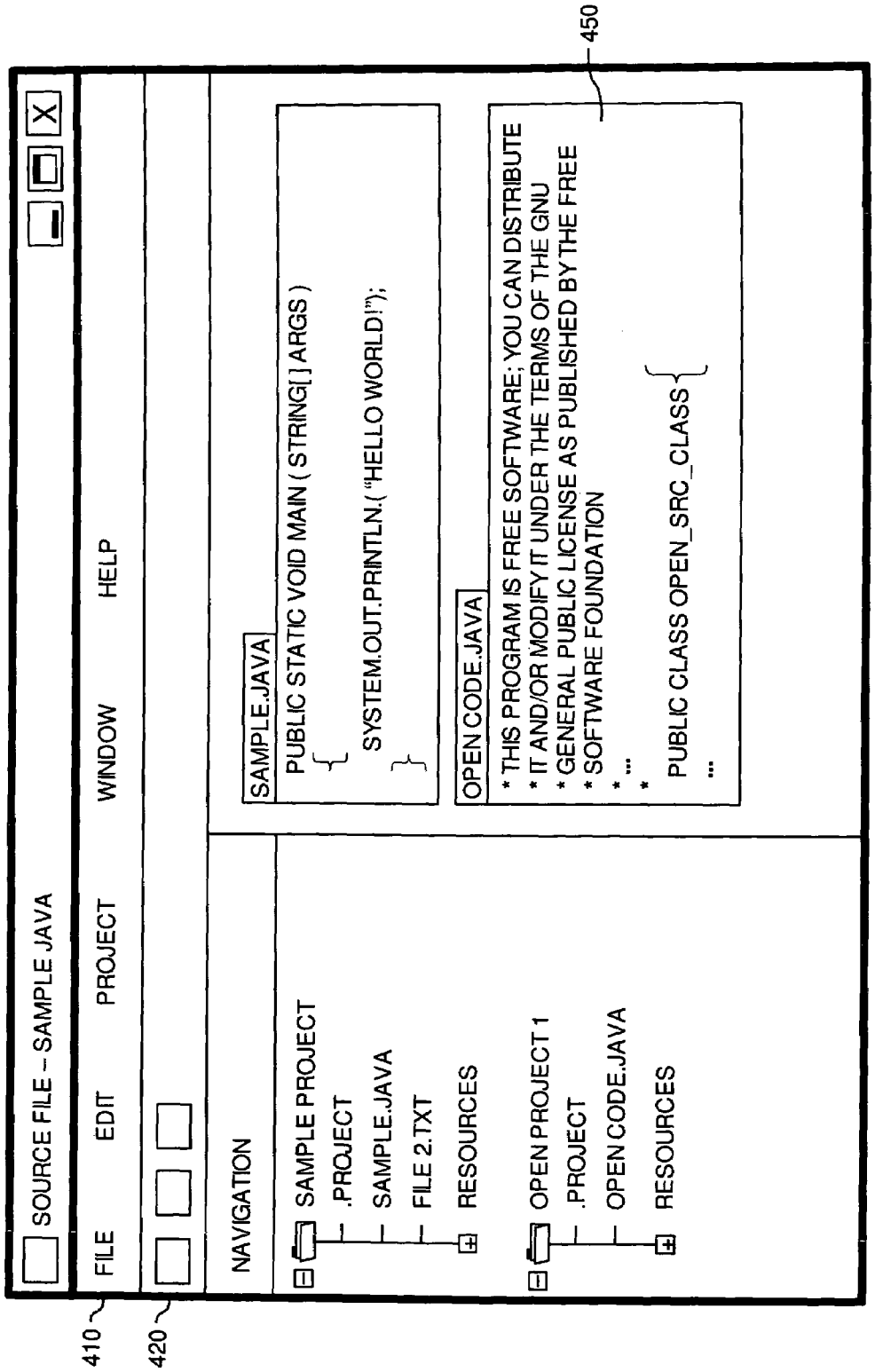

In one embodiment, clipboard manager 340 determines whether a licensing conflict exists by determining the license under which the source code fragment is available. For example, the clipboard manager 340 may be able to determine the license for the source code fragment from license data 120. If the source code fragment was copied from a file that is not currently associated with a project, then clipboard manger 340 may be configured to parse the file 150 to determine licensing information. Typically, source code files contain a copyright header with recognizable text that describes which license the code is being distributed under; this is especially the case for source code files distributed by open source projects. For example, FIG. 4B illustrates a second view of screen 400 after a user has opened up a second source code file 150 in a second editor window 310$_2$. At the top of the second source code file 150 is a header indicating that the source code for the "opencode.java" file is distributed under the GPL. The clipboard manger 340 prevents a programmer from coping code from the "opencode.java" file into the "sample.java" file, unless the license data 125 indicates that the "sample project" project can accept GPL code.

Alternatively, if the license of the source code being copied cannot be determined, the clipboard manger 340 may be configured to prompt the programmer to provide which license to associate with the source code being copied. In another embodiment, the clipboard manger 340 may be configured to prevent the paste operation, unless approved by a security manager or other individual with responsibility for licensing issues.

Figure 4C:
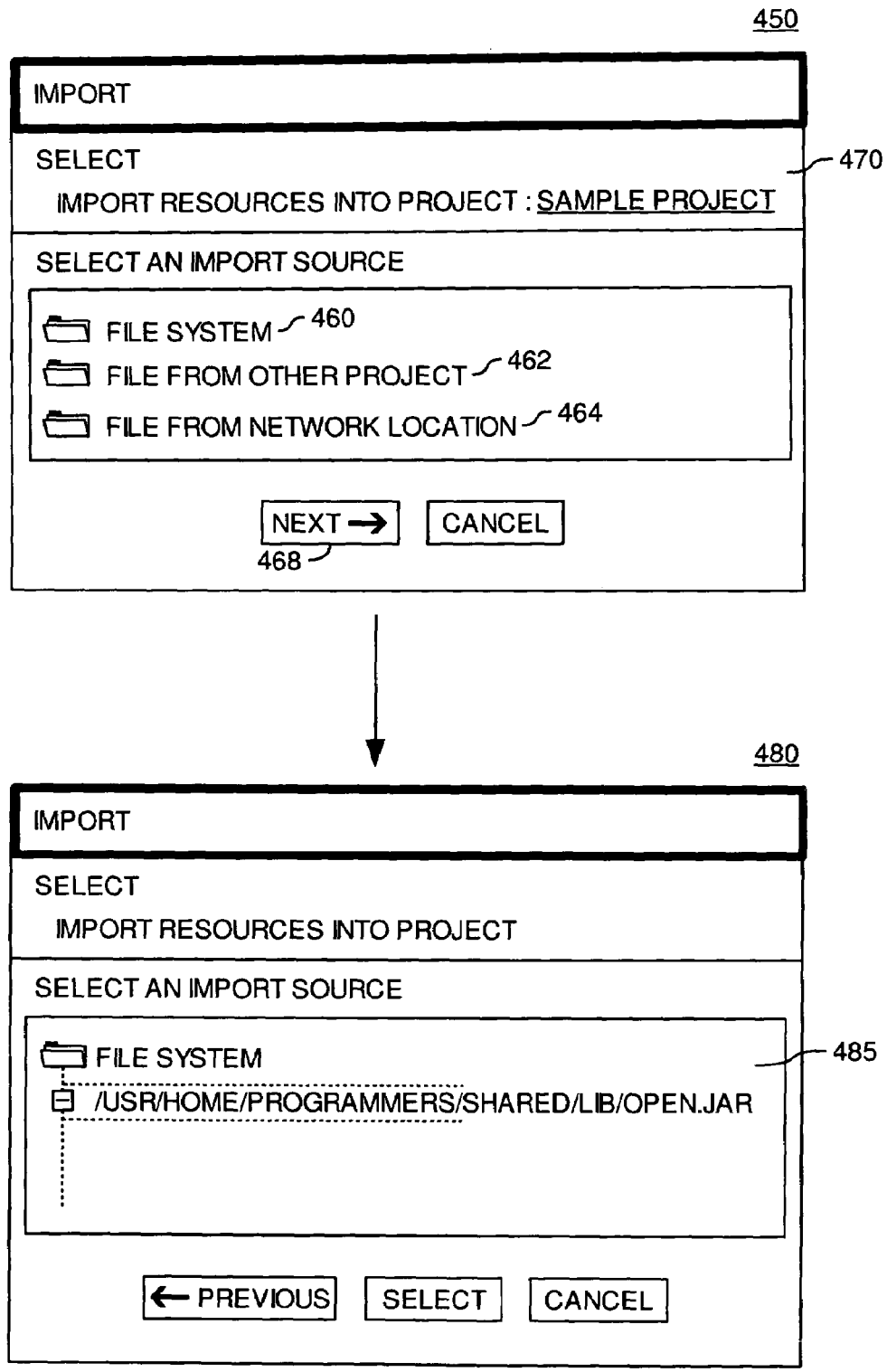

In addition to controlling the actions of the clipboard features provided by IDE 140, embodiments of the invention may limit what files or libraries may be included in a particular development project. In one embodiment, the IDE 140 limits the files that are associated by a project by determining license restrictions at the time files are imported into a particular project. For example, FIG. 4C illustrates a graphical user interface screen 450 displaying a dialog box that may be provided by the IDE after a programmer has accessed a file import feature from menu 410 or buttons 420. The dialog box 450 includes an indication 470 of what project a file is being imported into. As illustrated, a user may choose to import file from a local file system 460, from another project 462 (i.e., a file available in source code repository 150), or from a network location 464 (e.g., an HTTP or FTP server). Once a user selects an import source, a user may continue the import process using the next button 468. Thereafter, dialog box 480 may be displayed to allow a user to specify a file from the selected import source. As illustrated, FIG. 4C illustrates a display presented after a programmer has selected to import the file "/usr/home/Programmers/shared/lib/open.jar" 485 from the local file system into the "sample project" project.

After completing the file selection process, the file import manager 330 may be configured to determine whether the license of the file to be imported is compatible with the project that the file is being imported into. In one embodiment, this information is stored as part of license data 120. The import manager 330 may be configured to determine under what license a library is available by inspecting the contents of the library file. For example, Java® jar files customarily contain a copyright file with the archive, or may contain license values in the META-INF/MANIFEST.MF file included with each Java® .jar file. If the license for the project is compatible with the one associated with the file being imported, then it is added to the project. Thereafter, the file may be displayed as a file in navigation area 430.

FIG. 5A illustrates a license table 500 used by a license manager 125 to determine whether to prohibit a particular fragment of source code, or a library file, from being included in a given project, according to one embodiment of the invention. As illustrated, the columns of the license table each represent a particular license, e.g., public domain, the BSD or MIT or other academic licenses, the GPL and LGPL. Each row of the table stores data for a particular project, and what licenses code may be allowed. For example, project 2 prohibits the importation of any open source, or even public domain source code. Accordingly, project 2 may be an entirely closed source project. At the other end of the spectrum, project 1 will allow code distributed under any license, including the GPL. Thus, under the terms of the GPL, project 1 itself must be an open source project, itself distrusted under the GPL. Table 500 may be extended as needed to incorporate allow/deny indications for additional licenses. Many other licenses are available, both open source and proprietary.

FIG. 5B illustrates additional project data 500 maintained by license data 120. The license data 120 is used to ensure that any requirements created by importing code into a given project are included in the license under which the given project is distributed. As illustrated, each row indicates a restriction created by source code in the project, e.g., "must attribute the Apache open source project under terms of the MIT license." In addition, the row includes an indication of what file in the project includes the open source code creating the requirement. Additional logging data may also be included, such as the date, time, and the identity of the particular programmer who included the code fragment with the license requirement. FIG. 5C further illustrates project data maintained by license data 120. Each row of table 570 includes an entry associating a project with a file. One file may be associated with many projects. As projects are opened by a programmer, table 520 provides data for the navigation area displayed in FIGS. 4A-4C.

Figure 6:
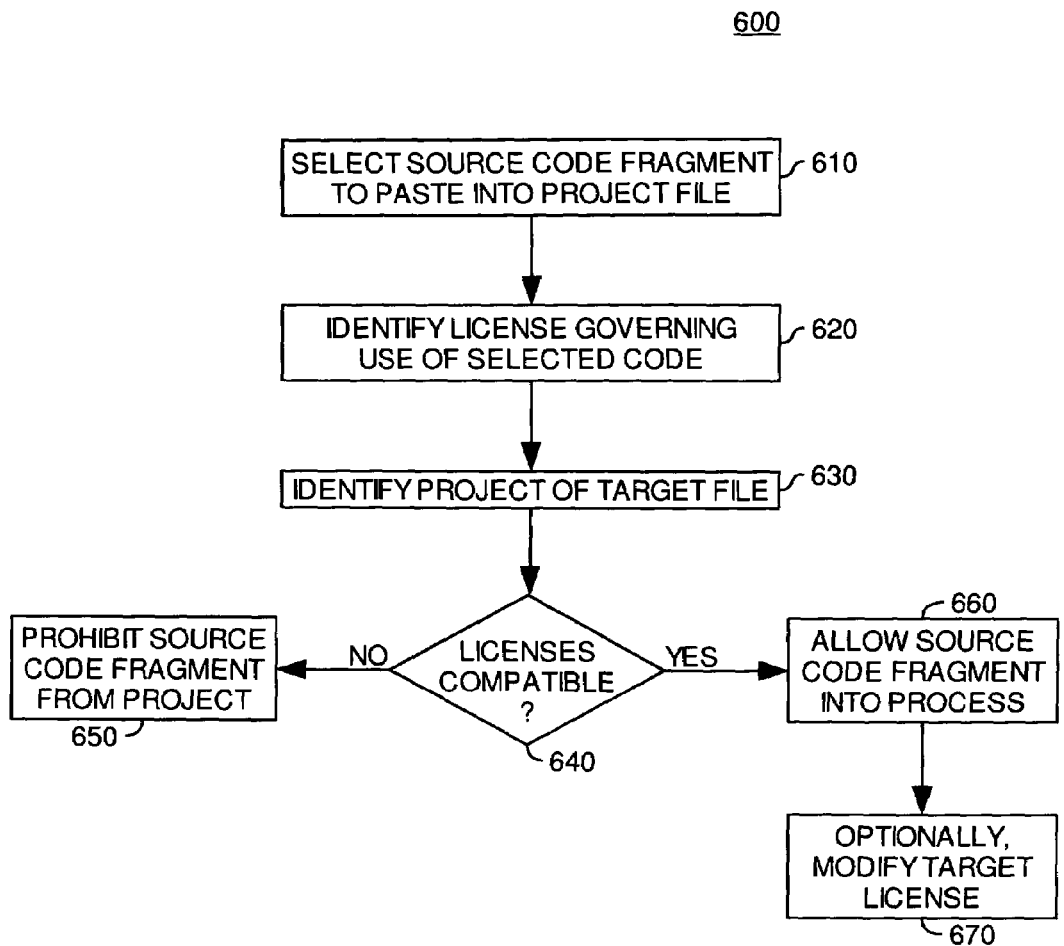
FIG. 6 illustrates a method for determining whether to allow a source code fragment to be copied into a project being developed, according to one embodiment of the invention.

FIG. 6 illustrates a method 600 for determining whether to include a source code fragment in a software project, according to one embodiment of the invention. For example, the method may begin at step 610 when a programmer selects a fragment of source code to copy and paste into a file for a given project. Additionally, the method 600 may be initiated when a developer includes source code that links to or references other files (e.g., using an #include or #import statement), or compiles a project (e.g., by parsing a makefile that specifies libraries to include in the compiling or linking processes). At step 620, the license manger 120 determines the license associated with the selected code. At step 630, the project associated with the target file is determined.

After determining the licenses for the source and destination of the copy and paste operation, at step 640 the license manager 120 determines whether the source code selected at step 610 may be included in the target file. In one embodiment, license manager may make this determination by referencing tables such as the ones illustrated in FIGS. 5A-5C. If the source code is distributed under a license that is incompatible with the license for the project being developed, (e.g., for the project identified in step 630), then the operation is prohibited (step 650). For example, a user may be presented with an error message identifying the license conflict. In one embodiment, developers may only be presented with a warning that the desired code may create a licensing conflict, but still allow the paste operation. Otherwise, if the desired source code is compatible with the license of the project being developed, the code is inserted into the target file (step 660). Optionally, at step 670, if the included code creates new licensing requirements for the project (or creates a conflict that must eventually be resolved), the license data 120 for the project identified at step 630 is updated to reflect the new requirements (e.g., a new entry in table 550).

Figure 7:
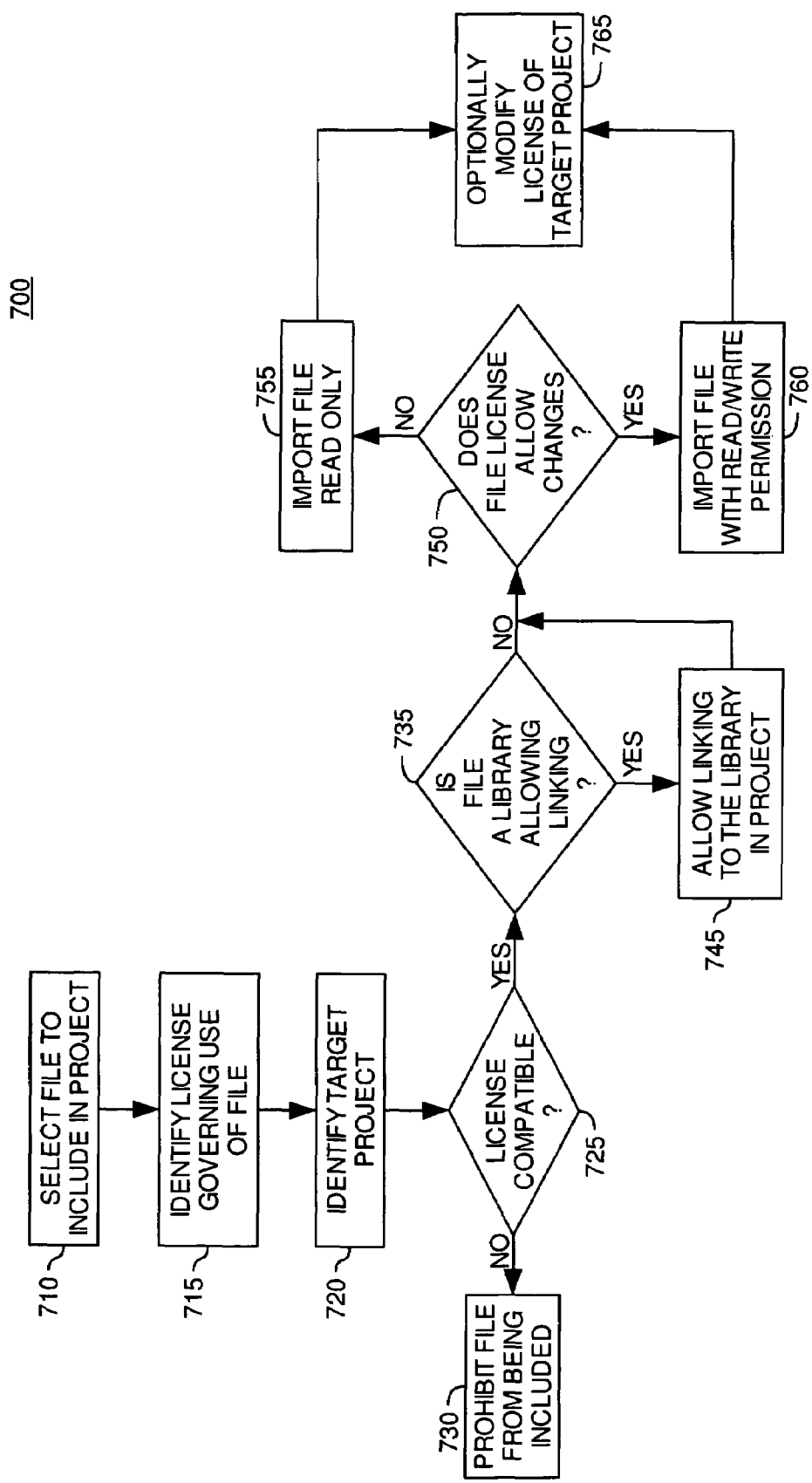
FIG. 7 illustrates a method for determining whether to include a library in a software project being developed, or to allow an application to link to a library, according to one embodiment of the invention.

FIG. 7 illustrates a method 700 for determining whether to include a file in a software project being developed, according to one embodiment of the invention. The method begins at step 710 when a file is selected to be imported into a given project. For example, a programmer may interact with the IDE 140 to import a file as described above in reference to FIG. 4C. At step 715, the license governing the use of the file is identified. For example, the import manager 340 may parse the file to determine if it includes a copyright header. At step 725, the license identified in step 720 is compared with the license of the target project that the file is being imported into. If the licenses identified at steps 715 and 720 are incompatible, then the method proceeds to step 730, and prevents the file from being imported in to the project. Otherwise, at step 735 the license manager 125 determines whether the file is a library available to be linked to by source code files in the target project. Is so, at step 745, the license data 120 is updated to allow the source code file may include statements that link to the desired library. At step 750, the method 700 determines whether the license identified at step 715 allows the file to be modified, (step 750). If not, the file is imported into the project as a read-only file (step 755), otherwise, the file is imported into the project with both read and write access permissions (step 760).

Additionally, as most programming languages allow a programmer to import code from a library using keywords for the programming language For example, the Java® programming language allows users to import both classes and packages using the "import <classname>" and "package <packagename>" keywords. When included in a source code file, these keywords allow a programmer to utilize the functions, methods, or classes from the imported class or package. When the code is then compiled, the compiler 320 incorporates the imported objects in the object code generated from the source code file. In one embodiment, the file import manager 330 may be configured to parse the contents of the source code files 150 in a project to determine what libraries are imported using programming language keywords. The compatibility of these libraries with the license requirements of the project may then be determined using the methods described above. If an incompatibility is identified, it may be flagged for review.

CONCLUSION

Embodiments of the present invention provide mechanism for controlling the source code that is included into software development project. In one embodiment, an integrated development environment controls the ingress of source code through, e.g., copy and paste operations (or other operations), as well as the libraries used by a project. License data is maintained for the files associated with a given project. When source code is to be introduced (e.g., copied) into a file, a license manger compares the licenses of the code fragment and the project associated with the file that the code is being introduced into. If the project will allow code under the license associated with the code fragment, the operation is allowed (e.g., the code is pasted into the file). Otherwise, it is prevented. Further, if importing the code fragment creates additional requirements for distributing the target project, then this information is recorded by the licensing manager. Licensing issues raised by importing library files may be similarly handled. By controlling the points of input for source code, embodiments of the invention help prevent source code distributed under one license from being included in an incompatible project. For example, embodiments of the invention may prevent a developer from unintentionally including source code distributed under the GPL in a project that a business intends to distribute using a proprietary license, or inadvertently including proprietary source code in an open source project.

While the foregoing is directed to embodiments of the present invention, other and further embodiments of the invention may be devised without departing from the basic scope thereof, and the scope thereof is determined by the claims that follow.

What is claimed is:

1. A computer-implemented method for a source code editing tool to manage a software development project that incorporates code objects subject to licensing restrictions, comprising:
    selecting a code object to paste into a first source code file, the first source code file being associated the software development project, wherein the code object includes one or more lines of source code copied from a second source code file, the second source code file not being associated with the software development project;
    identifying a target software license associated with the software development project;
    identifying a license associated with the code object;
    upon determining that the license associated with the code object is compatible with the target software license pasting the one or more lines of source code from the second source code file into the first source code file;
    upon determining that the license associated with the code object is incompatible with the target software license, prompting a user interacting with the source code editing tool that the one or more lines of source code have not been pasted into the first source code file;
    providing the user with an interface to override the determining that the license associated with is incompatible with the target software license; and
    in response to receiving a request received, via the interface, to override the determination that the license associated with the code object is incompatible with the target software license, pasting the one or more lines of source code from the second source code file into the first source code file.

2. The method of claim 1, further comprising, updating the target software license associated with the software development project based on a requirement of the license under which the one or more lines of source code are distributed.

3. The method of claim 2, wherein the requirement is one of an attribution requirement and a distribution requirement restricting how a software application corresponding to the software development project may be distributed.

4. The method of claim 1, wherein the one or more lines of source code identify a library linked to the first source code file, when compiled and executed.

5. The method of claim 1, wherein the license associated with the code object comprises an open source license.

6. The method of claim 1, wherein the code object is associated with the software development project as a read only code object, thereby prohibiting a user from modifying a version of the code object included in the software development project.

7. A computer-readable storage medium containing a program which, when executed on a processor, performs an operation for a source code editing tool to manage a software development project that incorporates code objects subject to licensing restrictions, the operation comprising:
   selecting a code object to paste into a first source code file, the first source code file being associated the software development project, wherein the code object includes one or more lines of source code copied from a second source code file, the second source code file not being associated with the software development project;
   identifying a target software license associated with the software development project;
   identifying a license associated with the code object;
   upon determining that the license associated with the code object is compatible with the target software license pasting the one or more lines of source code from the second source code file into the first source code file;
   upon determining that the license associated with the code object is incompatible with the target software license, prompting a user interacting with the source code editing tool that the one or more lines of source code have not been pasted into the first source code file;
   providing the user with an interface to override the determining that the license associated with is incompatible with the target software license; and
   in response to receiving a request received, via the interface, to override the determination that the license associated with the code object is incompatible with the target software license, pasting the one or more lines of source code from the second source code file into the first source code file.

8. The computer-readable storage medium of claim 7, wherein the operation further comprises, updating the target software license associated with the software development project based on a requirement of the license under which the one or more lines of source code are distributed.

9. The computer-readable storage medium of claim 8, wherein the requirement is one of an attribution requirement and a distribution requirement restricting how a software application corresponding to the software development project may be distributed.

10. The computer-readable storage medium of claim 7, wherein the one or more lines of source code identify a library linked to the first source code file, when compiled and executed.

11. The computer-readable storage medium of claim 7, wherein the license associated with the code object comprises an open source license.

12. The computer-readable storage medium of claim 7, wherein the code object is associated with the software development project as a read only code object, thereby prohibiting a user from modifying a version of the code object included in the software development project.

13. A system, comprising:
   a processor; and
   a memory containing a source-to-source compiler application, which when executed by the processor is configured to generate source code for a target architecture by performing the steps of:
      selecting a code object to paste into a first source code file, the first source code file being associated the software development project, wherein the code object includes one or more lines of source code copied from a second source code file, the second source code file not being associated with the software development project,
      identifying a target software license associated with the software development project,
      identifying a license associated with the code object,
      upon determining that the license associated with the code object is compatible with the target software license pasting the one or more lines of source code from the second source code file into the first source code file,
      upon determining that the license associated with the code object is incompatible with the target software license, prompting a user interacting with the source code editing tool that the one or more lines of source code have not been pasted into the first source code file,
      providing the user with an interface to override the determining that the license associated with is incompatible with the target software license, and
      in response to receiving a request received, via the interface, to override the determination that the license associated with the code object is incompatible with the target software license, pasting the one or more lines of source code from the second source code file into the first source code file.

14. The system of claim 13, wherein the steps further comprise, updating the target software license associated with the software development project based on a requirement of the license under which the one or more lines of source code are distributed.

15. The system of claim 14, wherein the requirement is one of an attribution requirement and a distribution requirement restricting how a software application corresponding to the software development project may be distributed.

16. The system of claim 13, wherein the one or more lines of source code identify a library linked to the first source code file, when compiled and executed.

17. The system of claim 13, wherein the license associated with the code object comprises an open source license.

18. The system of claim 13, wherein the code object is associated with the software development project as a read only code object, thereby prohibiting a user from modifying a version of the code object included in the software development project.

* * * * *